United States Patent
Swallow et al.

(10) Patent No.: US 7,746,796 B2
(45) Date of Patent: Jun. 29, 2010

(54) DIRECTED ECHO REQUESTS AND REVERSE TRACEROUTE

(75) Inventors: George Swallow, Boston, MA (US); Vanson Lim, Nashua, NH (US)

(73) Assignee: Cisco Technology, Inc., San Jose, CA (US)

(*) Notice: Subject to any disclaimer, the term of this patent is extended or adjusted under 35 U.S.C. 154(b) by 479 days.

(21) Appl. No.: 11/537,244

(22) Filed: Sep. 29, 2006

(65) Prior Publication Data
US 2008/0080507 A1  Apr. 3, 2008

(51) Int. Cl.
G01R 31/08 (2006.01)
H04L 12/28 (2006.01)
H04L 12/66 (2006.01)
G06F 15/173 (2006.01)

(52) U.S. Cl. .................. 370/249; 370/254; 370/255; 370/352; 370/389; 370/401; 709/224

(58) Field of Classification Search ............... None
See application file for complete search history.

(56) References Cited

U.S. PATENT DOCUMENTS

| | | | |
|---|---|---|---|
| 6,337,861 B1 | 1/2002 | Rosen | |
| 6,473,798 B1 | 10/2002 | Grosser, Jr. et al. | |
| 6,578,087 B1 | 6/2003 | Garakani et al. | |
| 6,747,957 B1 | 6/2004 | Pithawala et al. | |
| 6,965,572 B1 * | 11/2005 | Boodaghians | 370/249 |
| 6,973,023 B1 | 12/2005 | Saleh et al. | |
| 7,065,059 B1 | 6/2006 | Zinin | |
| 7,088,706 B2 | 8/2006 | Zhang et al. | |
| 7,197,008 B1 * | 3/2007 | Shabtay et al. | 370/218 |
| 2002/0165957 A1 * | 11/2002 | Devoe et al. | 709/224 |
| 2004/0066741 A1 * | 4/2004 | Dinker et al. | 370/216 |
| 2004/0218540 A1 | 11/2004 | Foschiano et al. | |
| 2005/0018647 A1 * | 1/2005 | Lebrun et al. | 370/351 |
| 2005/0018667 A1 | 1/2005 | Chandra et al. | |
| 2005/0047350 A1 * | 3/2005 | Kantor et al. | 370/254 |
| 2005/0073979 A1 * | 4/2005 | Barber et al. | 370/338 |
| 2005/0147051 A1 | 7/2005 | Suri | |
| 2006/0013142 A1 * | 1/2006 | Hongal et al. | 370/248 |

(Continued)

OTHER PUBLICATIONS

Postel, J., Network Working Group, Request for Comments: 792, entitled "Internet Control Message Protocol: Darpa Internet Program Protocol Specification", Sep. 1981, pp. 1-21.

Kompella, K., et al., Network Working Group, Request for Comments: 4379, entitled "Detecting Multi-Protocol Label Switched (MPLS) Data Plane Failures", Feb. 2006, pp. 1-47.

*Primary Examiner*—Huy D Vu
*Assistant Examiner*—Brandon Renner
(74) *Attorney, Agent, or Firm*—Cesari and McKenna, LLP

(57) ABSTRACT

In one embodiment, a first node may send an out-of-band message to a second node to request that the second node initiate an in-band echo request for a specified tunnel, e.g., toward one or more third nodes. Upon receiving the in-band echo request, one or more responding nodes (e.g., generally the third nodes) may send a response to the first node. This "directed echo request" technique may also be used in conjunction with a "reverse traceroute" technique.

26 Claims, 8 Drawing Sheets

U.S. PATENT DOCUMENTS

| | | | |
|---|---|---|---|
| 2006/0098586 A1* | 5/2006 | Farrell et al. | 370/254 |
| 2006/0133300 A1* | 6/2006 | Lee et al. | 370/254 |
| 2006/0140132 A1* | 6/2006 | Lee et al. | 370/248 |
| 2006/0198321 A1* | 9/2006 | Nadeau et al. | 370/254 |
| 2007/0011319 A1* | 1/2007 | McClure et al. | 709/224 |
| 2009/0122723 A1* | 5/2009 | Hirano et al. | 370/255 |

* cited by examiner

DIRECTED ECHO REQUESTS AND REVERSE TRACEROUTE

TECHNICAL FIELD

The present disclosure relates generally to computer networks, and, more particularly, to echo requests.

BACKGROUND

It is often desirable to verify the connectivity between two or more nodes of a computer network. Connectivity verification protocol exchanges, such as, e.g., Multi-Protocol Label Switching (MPLS) echo messages ("pings"), Internet Control Message Protocol (ICMP) echo messages/pings, bidirectional forwarding detection (BFD) messages, "hello" messages, etc., may be used to generate request/reply messages to verify such connectivity between the nodes. For instance, a first node may send an echo request to a second node, which upon receiving the request, may return an echo reply/response to the first node. Generally, these echo request/reply messages may be sent between the nodes using a transmission protocol, e.g., using the Internet Protocol (IP), Asynchronous Transfer Mode (ATM) signaling, etc., or tunnels established therein.

Broadly stated, a tunnel is a logical structure that encapsulates a packet (a header and data) of one protocol inside a field, e.g., a data field, of another protocol packet with a new header. In this manner, a tunnel creates a transparent virtual network link between two network nodes that is generally unaffected by physical network links or devices (i.e., the physical network links or devices merely forward the encapsulated packet based on the new header). By this broad definition, one example of a tunnel is any MPLS Label Switched Path (LSP), and other known tunneling methods include, inter alia, the Layer Two Tunnel Protocol (L2TP), the Point-to-Point Tunneling Protocol (PPTP), and IP tunnels. A packet that is forwarded within a tunnel may generally be considered to be "in-band" within the tunnel. Conversely, a packet not forwarded within that tunnel may be considered to be "out-of-band" from that tunnel. Therefore, a message (e.g., an echo request/reply message) that is sent within the tunnel is referred to as an "in-band" message, while a message not sent within the tunnel is referred to as an "out-of-band" message.

Traceroute techniques have been developed as an extension to echo requests in order to trace the route (path) that a packet traverses between two or more nodes. Conventionally, a traceroute is performed by sending echo requests from a source node to a destination node that have progressively longer time-to-live (TTL) values. For instance, a first echo request with a TTL of "1" may reach the first intermediate node between the source and destination (a "next-hop" node). When the first intermediate node receives the echo request, it decrements the TTL to "0", and returns a message (e.g., an error message) to the source node (generally, with the address of the first intermediate node). The source node may then send a second echo request with a TTL of "2" that is received by the first intermediate node, which decrements the TTL to "1" and forwards the echo request to a second intermediate node (a "next-next-hop" node). The second intermediate node decrements the TTL to "0", and also returns a message (e.g., an error message) to the source node. The source node may continue to send subsequent echo requests with increasing TTL values until the route between the source and destination has been traced.

Traceroute techniques may also be used with tunnels (e.g., MPLS Traceroute) in a similar manner. For instance, assume the source node is an ingress to a tunnel, and that the destination node is the tunnel egress. The source node injects in-band echo requests with increasing TTL values into the tunnel. As described above, each successive intermediate in-band node (hop) that receives an expired TTL echo request replies to the source node accordingly (e.g., with an out-of-band reply).

While a conventional tunnel is established between a source end node and a destination end node, i.e., a "point-to-point" (P2P) tunnel, a multipoint tunnel, on the other hand, may be employed that connects one or more source end points to one or more destination end points, e.g., along a shared tree. The multipoint tunnel may be used in a manner similar to (and may complement) IP multicast, with packet replication at various nodes of the shared tree, as will be understood by those skilled in the art. A "Point-to-Multipoint" (P2 MP) tunnel, for example, has one source end node (ingress node) to source traffic onto the P2 MP tunnel, and multiple destination end nodes (egress nodes) to receive the traffic from the P2 MP tunnel.

In a conventional P2 MP tunnel traceroute, it is expected that all nodes n hops away (i.e., where "n" is the initial TTL value) will reply. As trace progresses, therefore, an increasingly large number (e.g., potentially thousands) of replies may be generated as the P2 MP tree "branches" (expands) toward the multipoint egress nodes (leafs). The source node typically processes all of these replies, which may pose a processing burden for that node. In particular, because a failure is detected by a lack of response from a node, any replies that fail to be processed by the source node may result in improper failure determination ("false positives"). Also, in the event an actual failure is limited to a few leaf (egress) nodes, the use of conventional traceroute may become especially egregious, since the failure is most likely close to the egress nodes.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
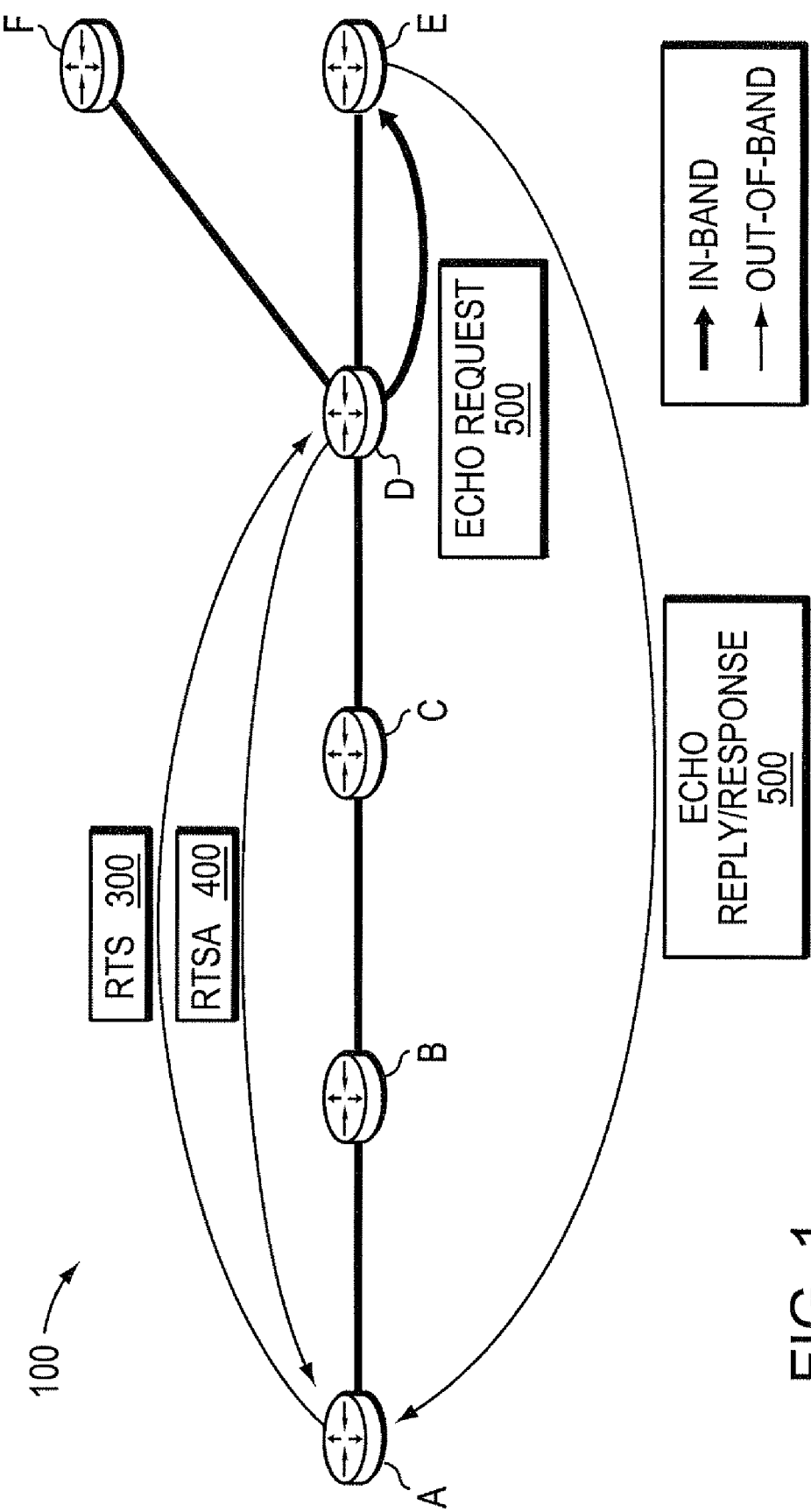
FIG. 1 illustrates an example computer network.

According to embodiments of the disclosure, a first node may send an out-of-band message to a second node to request that the second node initiate an in-band echo request for a specified tunnel, e.g., toward one or more third nodes. Upon receiving the in-band echo request, one or more responding nodes (e.g., generally the third nodes) may send a response to the first node.

Also, according to embodiments of the disclosure, an interested node may send an out-of-band echo request to an in-band egress node. If the egress node responds, the interested node may send an out-of-band message to successive previous-hop in-band nodes to request that each successive previous-hop node initiate an in-band echo request toward the egress node, and a response may be sent to the interested node accordingly. The interested node may continue to send out-of-band messages to successively previous-hop nodes until no longer necessary, e.g., thus working backwards to discover an in-band failure.

Further, according to embodiments of the disclosure, one or more data structures are provided that may be used by a first node to request that the second node initiate an in-band echo request for a specified tunnel. One or more data structures are also provided that may be used by a second node to acknowledge receipt of the request to the first node.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an exemplary computer network 100 illustratively comprising nodes (e.g., routers) A-F interconnected by links as shown. Those skilled in the art will understand that any number of nodes, routers, links, etc. may be used in the computer network, and that the view shown herein is for simplicity. Those skilled in the art will also understand that while the present invention is described generally, it may apply to any network configuration within an AS or area, or throughout multiple ASes or areas, etc. Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

In example embodiments, the routers described herein are IP routers that implement Multi-Protocol Label Switching (MPLS) (or Generalized MPLS, "GMPLS") and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress, a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs, or, more generally herein, as tunnels. Establishment of a tunnel requires computation of a path, signaling along the path, and modification of forwarding tables along the path. MPLS, illustratively, may establish LSPs that have guaranteed bandwidth under certain conditions, e.g., by signaling the LSP through the use of the Resource ReSerVation Protocol (RSVP), which is a network-control protocol that enables applications to reserve resources in order to obtain special Quality of Service (QoS) for their data flows. It should be understood that the use of RSVP serves only as an example, and that other communication protocols may be used in accordance with the present invention.

In accordance with example embodiments described herein, the nodes of the computer network 100 may illustratively be configured as part of a Point-to-Multipoint (P2 MP) tree structure, as will be understood by those skilled in the art. For instance, source/ingress node A may connect to one or more destination/egress nodes (leaf nodes), e.g., nodes E and F, through intermediate/transit nodes B-D. In other words, the source node may source traffic onto the P2 MP tunnel, and multiple destination end nodes (egress nodes) may receive the traffic from the P2 MP tunnel. Notably, while embodiments of the present invention are described within a P2 MP tree, the techniques described herein may also be used with Multi-point-to-Multipoint (MP2 MP) tree structures (e.g., where each source/ingress acts as a source/ingress to a P2 MP tree). Moreover, embodiments of the disclosure are described with a P2 MP tunnel/tree having one source/ingress and two egresses for simplicity. Those skilled in the art will understand that many sources/ingresses (MP2 MP trees) and many destinations/egresses (e.g., hundreds to thousands, etc.) may be advantageously used as well.

Figure 2:
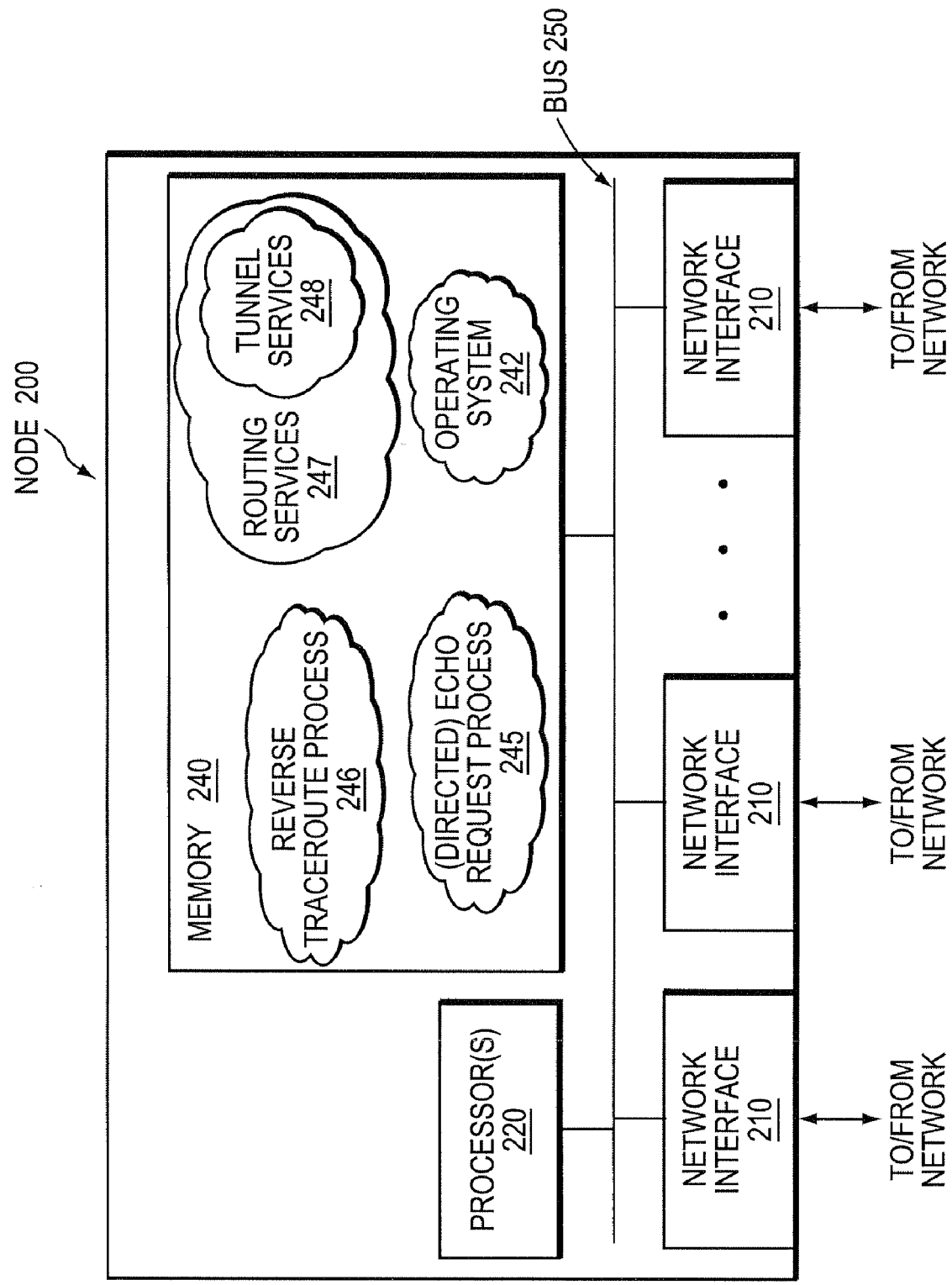
FIG. 2 illustrates an example network device/node.

FIG. 2 is a schematic block diagram of an exemplary node/router 200 that may be advantageously used with one or more embodiments described herein, e.g., as a source/interested node, transit/intermediate node, or egress (leaf) node. The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor, functionally organizes the node by, inter alia, invoking network operations in support of software processes and/or services executing on the router. These software processes and/or services may comprise routing services 247, tunnel services 248, an "echo request" or "directed echo request" process/service 245 described herein, and "reverse traceroute" process/service 246, also described herein. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 247 may also perform functions related to virtual routing protocols, such as maintaining VRF instances (not shown) as will be understood by those skilled in the art.

Tunnel services 248 contain computer executable instructions for implementing one or more protocols useful for establishing and maintaining tunnels and their associated operation, such as, e.g., MPLS, MPLS-TE, RSVP, etc., as will be understood by those skilled in the art. For example, as used herein, tunnel services 248 may be used to establish, maintain, and operate the P2 MP tunnel tree of network 100.

Directed Echo Requests

According to embodiments of the disclosure, a first node (e.g., node A) may send an out-of-band message to a second node (e.g., node D) to request that the second node initiate an in-band echo request for a specified tunnel, e.g., toward one or more third nodes (e.g., egress node E and/or F). Upon receiving the in-band echo request, one or more responding nodes (e.g., generally the third nodes) may send a response to the first node. In this manner, the first node may perform a "directed echo request" or "directed ping," in that the echo request is initiated by a node other than the first node, yet the echo response is sent to the first node. For instance, a first node may request that a second node located anywhere along a tunnel inject an echo request into the tunnel to determine whether the third node is reachable from the second node via the tunnel (i.e., in-band). Also, while the first node is illustratively shown as the source/ingress node of a tunnel, the first node need not be located along the same tunnel (an "in-band node"). For example, the first node may be an administration/management node located elsewhere (e.g., out-of-band) within the network. Broadly stated, an in-band node is defined as any node (e.g., end-points and/or mid-points) along the tunnel receiving the injected echo request.

Figure 3:
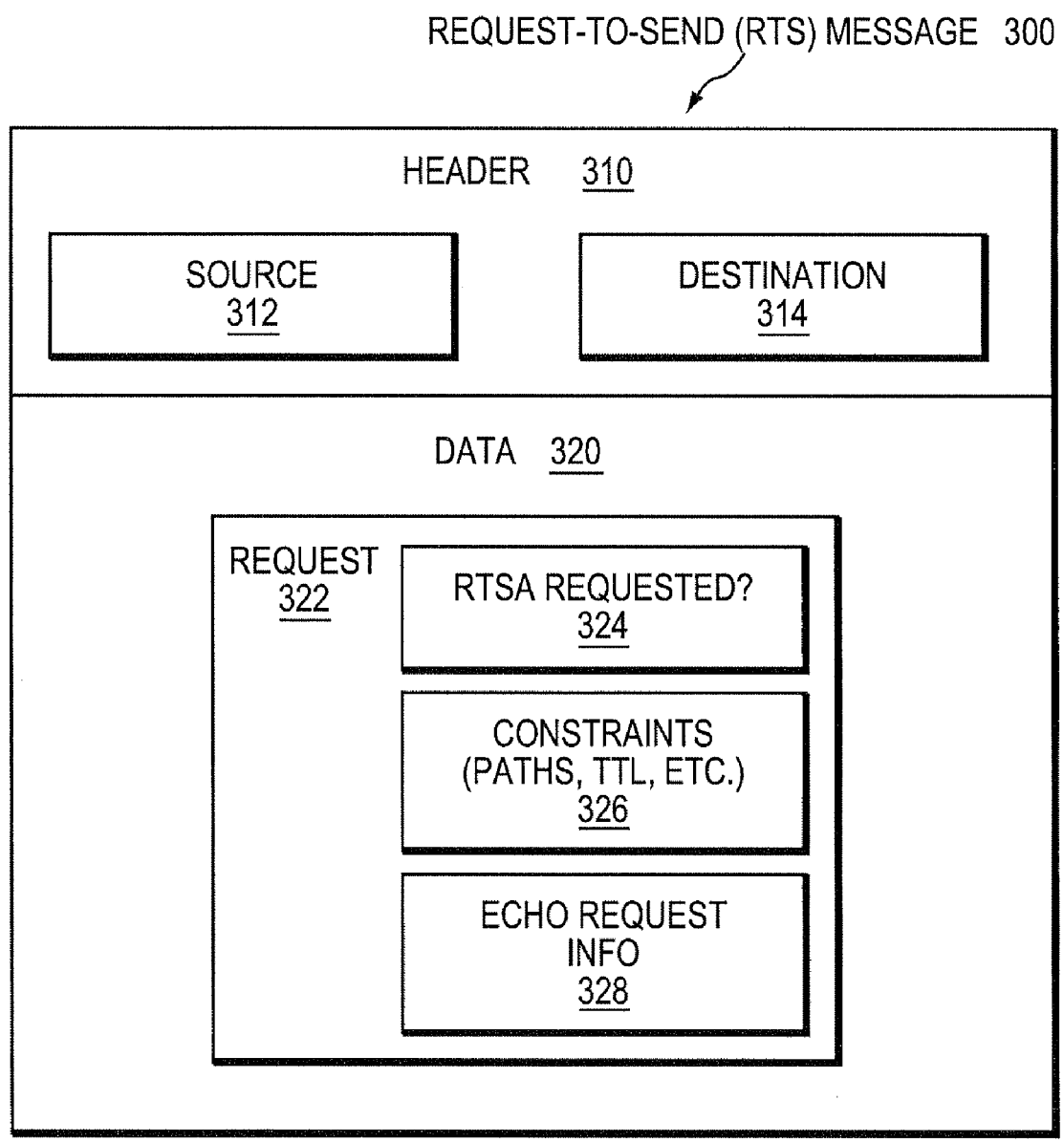
FIG. 3 illustrates an example Request-To-Send (RTS) object/message.

Illustratively, for a first/interested node (e.g., node A) to request that a second node (e.g., node D) initiate an in-band echo request for a specified tunnel, e.g., toward a third node (e.g., node E), the first node may send an out-of-band Request-To-Send (RTS) echo request message to the second node. FIG. 3 illustrates an example RTS message 300 that may be advantageously used with one or more embodiments described herein. As an example, the message 300 is shown as a high-level message, and those skilled in the art will understand that more specific fields/objects may be used accordingly. The RTS message 300 includes one or more headers 310, e.g., as defined by an encapsulation protocol, as well as one or more other fields, such as a source address field 312 and destination address field 314. As those skilled in the art will understand, RTS messages 300 may be sent in an encapsulation format appropriate to the environment (e.g., TCP/IP, ATM, MPLS, etc.). Thus, the encapsulation protocol header of header 310 contains information standard for the specific type of encapsulation.

Data field 320 of the RTS message 300 may be used to contain information relevant to the request. For example, a request field 322 may illustratively contain the RTS request, e.g., one or more codes and/or type values (not shown) that may be used to request that a second node (e.g., node D) send an in-band echo request message to a third node (e.g., node E). That is, an echo request information field 328 may comprise additional information that may be used by the second node to generate the in-band echo request, e.g., as described herein. Alternatively, the echo request information field 328 may optionally comprise the actual echo request (e.g., 500 below) that the first node (e.g., node A) wishes the second node send to the third node (e.g., which, as described below, may contain the destination of the third node). In embodiments having an optional acknowledgement of the RTS message 300, an "RTS-Acknowledgement (RTSA) requested" field 324 may be present to indicate to the second (receiving) node, e.g., via one or more flags, values, etc., whether the first node desires an RTSA message, described below. Notably, the RTSA requested field 324 may also indicate whether the RTS message 300 requests that only an RTSA message be returned, and that no echo request be sent (e.g., for administration/management purposes).

Upon receiving the RTS message 300, the second (receiving) node (e.g., node D) may verify that it has state for the corresponding in-band tunnel/tree. For instance, request field 322 of the RTS message 300 may contain one or more Forwarding Equivalence Classes (FECs) in an FEC stack, where an FEC generally describes (e.g., identifies) a particular tunnel/tree. This is similar to conventional tunnel (MPLS) echo requests, as will be understood by those skilled in the art. If state is found (i.e., if the second node is in-band for the desired tunnel/tree), the second node reacts by attempting to insert/inject an in-band echo request (as specified in the RTS message 300) into the tunnel/tree toward the one or more third nodes (e.g., node E and/or F), and optionally by replying to the RTS message 300 with an out-of-band RTSA message sent to the first/interested node (e.g., node A) (e.g., as configured and/or based on RTSA requested field 324 of the RTS message 300). Notably, the order of these two reactions need not be as described, such that the in-band echo request may be sent after the RTSA message.

Figure 4:
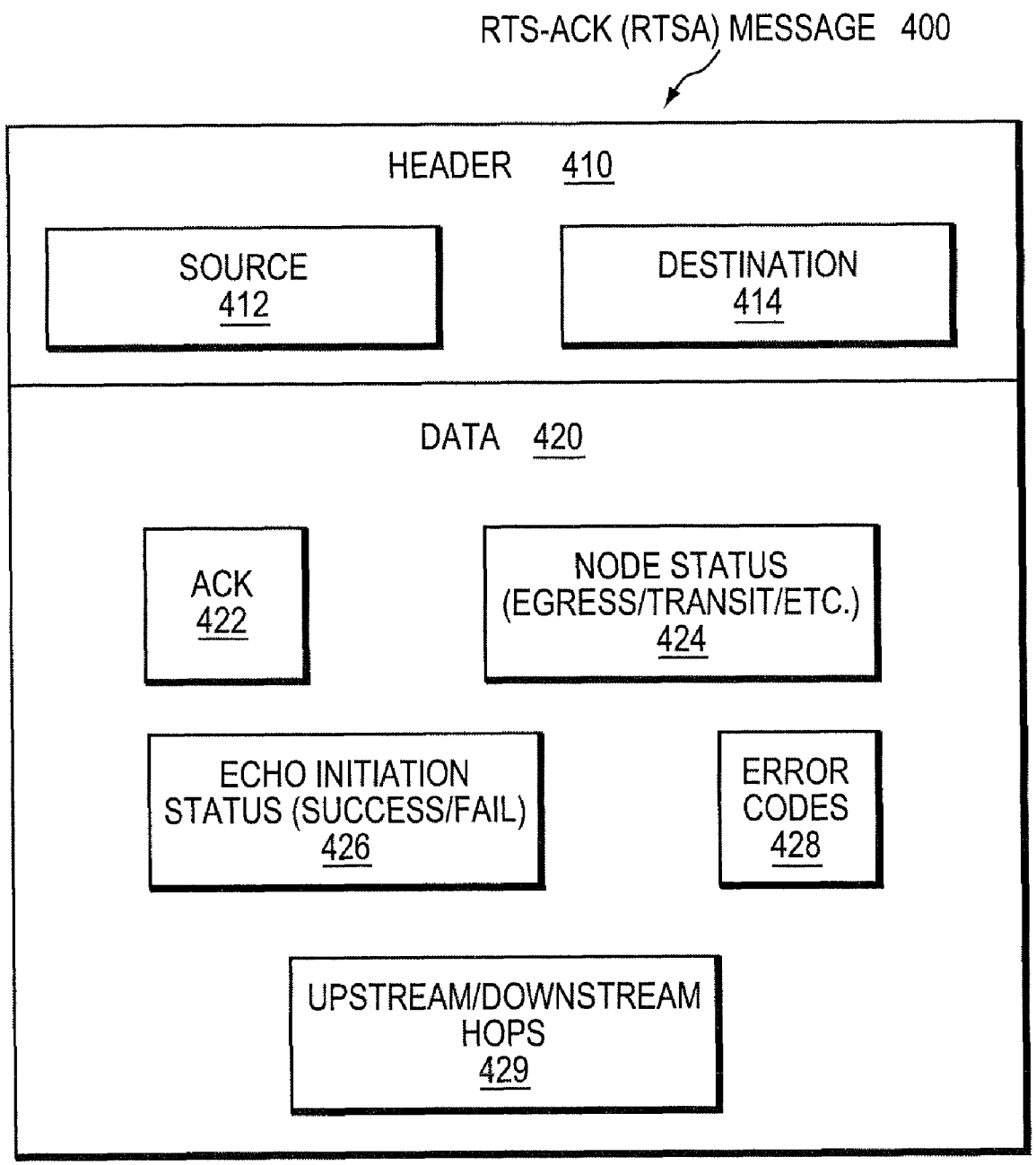
FIG. 4 illustrates an example Request-To-Send-Acknowledgement (RTSA) object/message.

FIG. 4 illustrates an example Request-To-Send-Acknowledgement (RTS-Ack or RTSA) message 400 that may be advantageously used with one or more embodiments described herein. Illustratively, the message 400 is shown as a high-level message, and those skilled in the art will understand that more specific fields/objects may be used accordingly. The RTSA message 400 includes one or more headers 410, e.g., as defined by an encapsulation protocol, as well as one or more other fields, such as a source address field 412 and destination address field 414. As those skilled in the art will understand, RTSA messages 400 may be sent in an encapsulation appropriate to the environment (e.g., TCP/IP, ATM, MPLS, etc.). Thus, the encapsulation protocol header of header 410 contains information standard for the specific type of encapsulation. Notably, in example embodiments described herein, the RTSA message 400 is sent out-of-band to the first/interested node. Those skilled in the art will understand that out-of-band need not limit the transmission to non-tunneled forwarding, but that the transmission is out-of-band from the interested in-band tunnel.

Data field 420 of the RTSA message 400 may be used to contain information relevant for the acknowledgement. For example, an "ACK" field 422 may be used to indicate, e.g., through one or more flags/values, that the RTS message 300 was received. More specifically, a node status field 424 may be used to indicate whether the second/receiving node is an egress for the tunnel (for the FEC), a transit/intermediate node for the tunnel, a source/ingress node for the tunnel, etc. Also, in the event the echo request is sent prior to the RTSA message 400, an echo initiation status field 426 may be used to indicate whether the in-band echo request was transmitted successfully. Further, an error code field 428 may be used to transmit any errors (e.g., incorrect FEC, echo request failures, etc.) to the first/interested node. Use of the upstream/downstream hop field 429 is described further below.

Assuming the second node (e.g., node D) is able to comply with the RTS echo request, the second node injects/inserts an in-band echo request into the corresponding tunnel/tree toward the one or more third nodes (e.g., node E and/or F), essentially requesting that the third/responding node respond to the first/interested node (e.g., node A). Notably, the third node need not be the responding node. For example, due to various factors, such as errors, constraints, etc., as described herein, the responding node may be a different node than the third node, and in fact, need not be along the tunnel. Once the in-band echo request is inserted, conventional in-band echo request operation may continue, as will be understood by those skilled in the art. An example of a tunneling echo message is described in RFC 4379, entitled *Detecting Multi-Protocol Label Switching (MPLS) Data Plane Failures*, dated February 2006.

Figure 5:
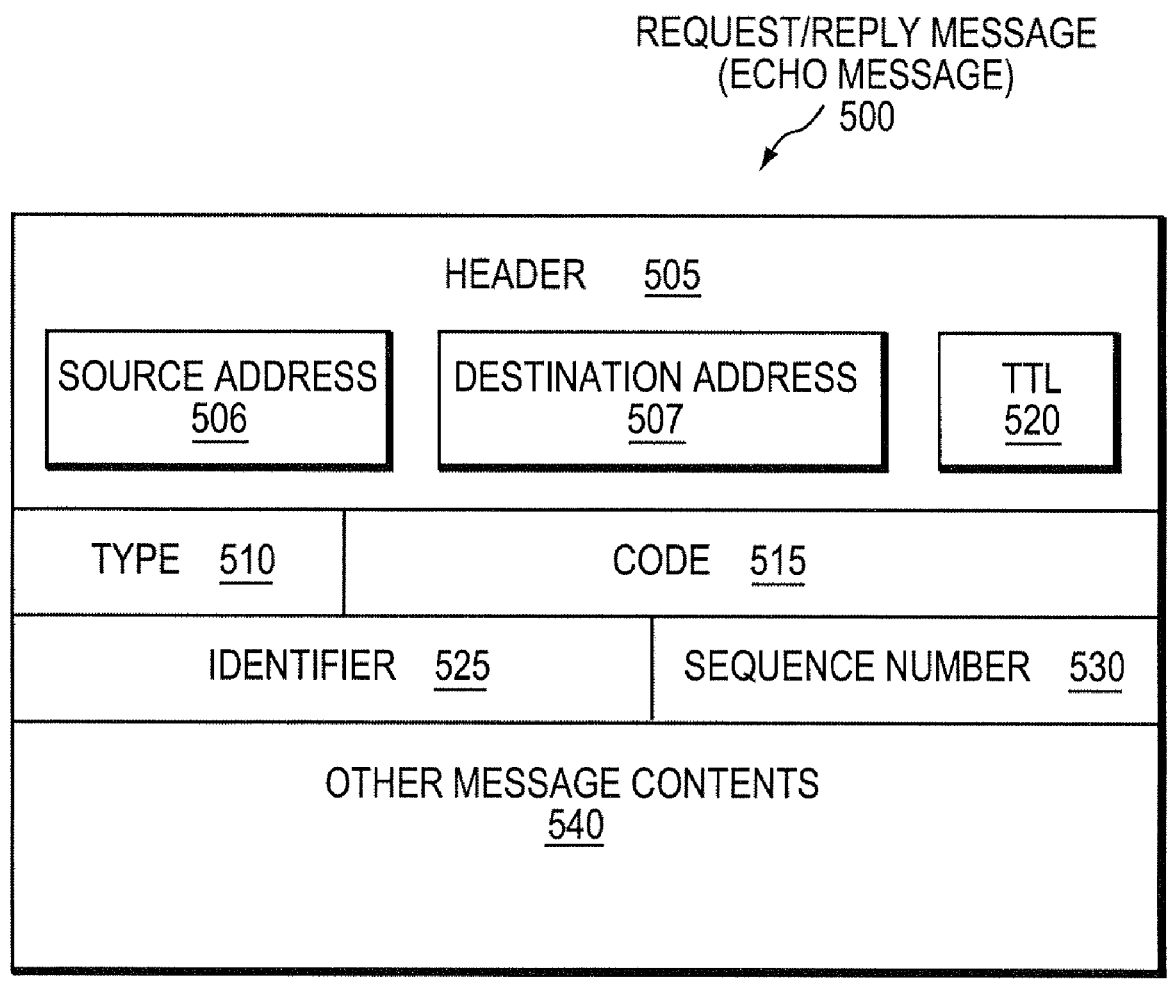
FIG. 5 illustrates an example echo request/response (ping) message.

FIG. 5 is a schematic block diagram of an exemplary echo request/reply message 500 that may be advantageously used with one or more embodiments described herein. Illustratively, request/reply message is embodied as an MPLS echo message ("ping"), e.g., as described in RFC 4379. Those skilled in the art will understand that while an MPLS echo message is shown, other request/reply messages may be used in accordance with the present invention, such as, e.g., other echo/ping messages (such as ICMP echo messages, described in RFC 792, entitled *Internet Control Message Protocol*, dated September 1981), etc., or other connectivity verification protocol exchanges, such as, e.g., bidirectional forwarding detection (BFD) messages, IGP "Hello" messages, etc.

The message 500 may comprise a header 505, a type field 510, code field 515, a conventional "time-to-live" (TTL) field 520, an identifier field 525, a sequence number field 530, and an "other message contents" field 540. The source address 506 and destination address 507 within the header 505 are the network addresses (or labels) for the sending device (e.g., interested node A or a previous-hop node) and the receiving device (e.g., egress node E or F, or a next-hop toward the egress nodes), respectively. Notably, while the source address 506 may be modified to be the interested node address (so the replying node returns a reply thereto), the second node may also provide the source address, in particular, as its own address (e.g., for security/protocol needs). Type field 510 contains a specific type value indicating whether the message 500 is an echo message or an echo reply message, while the code field 515 of an echo message may be used for other purposed as will be understood by those skilled in the art. The identifier 525 and sequence number 530 may be used to assist routers in matching echo requests and replies, such as by identifying a particular echo request session with a distinct value (at the sending device), and incrementing the sequence number based on the number of requests sent, as will be understood by those skilled in the art. The other message contents 540 of an echo request may be used to contain one or more objects useful to the echo request/reply (e.g., one or more type-length-value, or "TLV" objects as will be understood by those skilled in the art).

To respond to an echo request 500, the responding device (e.g., node E) replies by formatting an echo response/reply 500 in the following manner: setting the source address 506, setting the destination address 507 (e.g., to an address specified by the echo request source address 506 or by other message contents 540), setting the type 510 to a reply, setting the code field 515 to indicate success or type of error, copying the identifier 525 and sequence number 530, and possibly including other message contents 540. In this manner, the echo reply 500 returns to the sending device (e.g., node A). Notably, because the intermediate/transit node (e.g., node D) has injected/generated the echo request, the source address 506 of the original request is configured to be that of the interested node (node A), and, thus, the reply returns to the interested node.

When a positive reply (one indicating reachability) reaches the first/interested node (e.g., the initial device sending the RTS echo request), the first node determines that the third node is reachable by the second node. Conversely, if no reply is received at the first/interested node, or if an unexpected (negative) reply is received from a responding node that is not the third node (e.g., not along the tunnel or an unexpected egress, due to a break in the tunnel, etc.), it may be determined that the second node can not reach the third node in-band. (In addition, assuming the RTSA message 400 has been received by the first node, it may be more specifically determined that the tunnel between the second and third nodes has a failure, and not that the second node has itself failed.) Notably, the (directed) echo request process/services 245 may contain computer executable instructions for implementing echo request functions in accordance with one or more embodiments described herein, such as, e.g., the creation, distribution, processing, etc., of RTS message 300, RTSA message 400, and echo request/reply message 500 accordingly.

Also, the directed echo request may request that an in-band echo request be sent into a P2 MP tree structure, which based on conventional multicasting techniques may branch at the second node, as will be understood by those skilled in the art.

To limit the number of responses (e.g., the number of "responding/third nodes receiving the in-band echo request), then, the first node may include within the out-of-band RTS message 300 a specific request to limit in-band transmission to one or more branches (e.g., to one or more egress nodes or one or more next-hop neighbors), such as in the constraints field 326 of the RTS message. For instance, rather than receiving responses from both egress nodes E and F, the first node (e.g., node A) may include a constraint that only the branch leading to node E be used.

Figure 6:
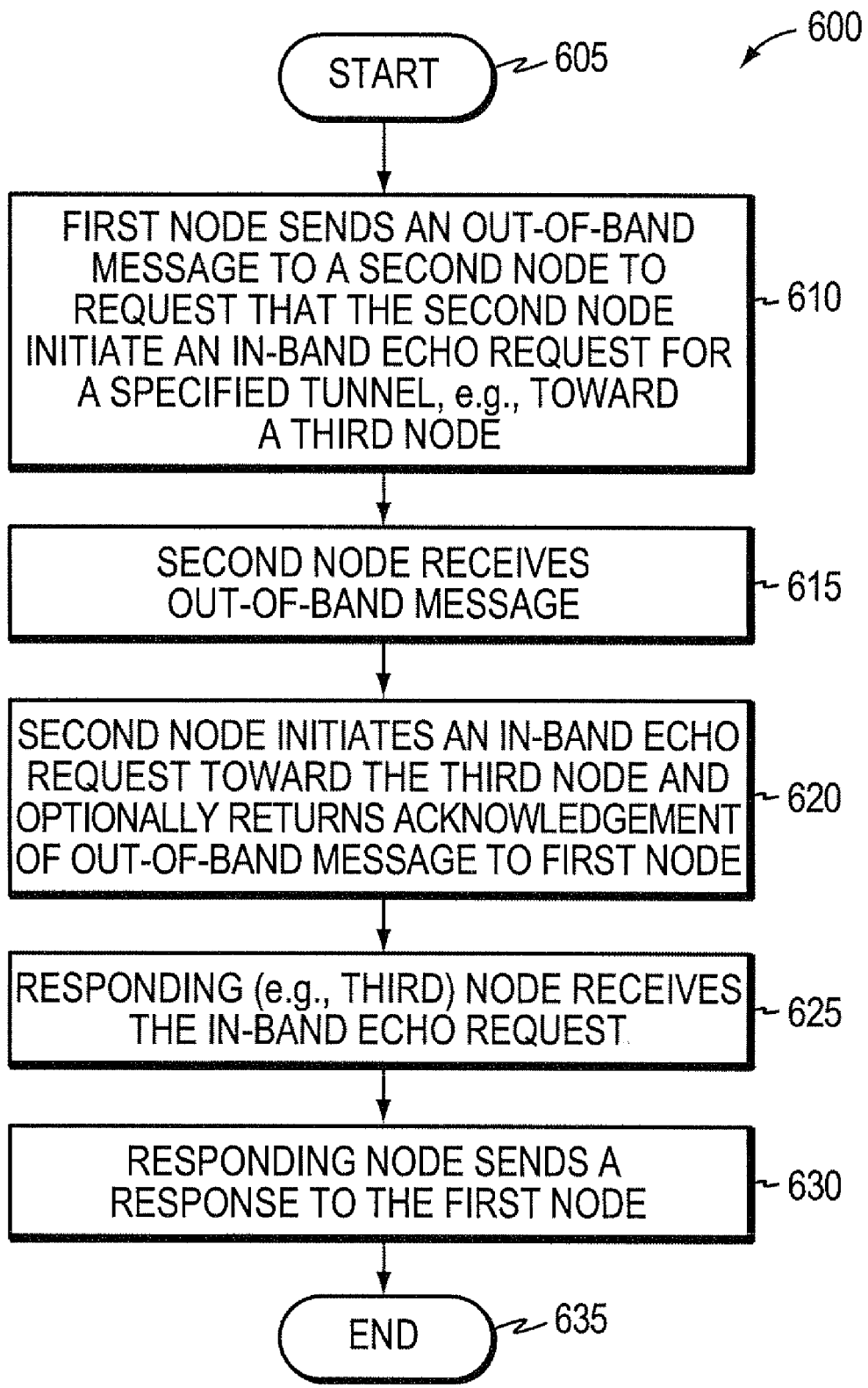
FIG. 6 illustrates an example procedure for a directed echo request.

FIG. 6 illustrates an example procedure for a directed echo request (e.g., a directed ping) in accordance with one or more embodiments described herein. The procedure 600 starts at step 605, and continues to step 610, where a first node (e.g., node A) sends an out-of-band message (e.g., an RTS message 300) to a second node (e.g., node D) to request that the second node initiate an in-band echo request 500 for a specified tunnel, e.g., toward a third node (e.g., node E). For example, as described above, the out-of-band message may be sent over IP routes, while the in-band request may be sent through a tunnel, such as an MPLS LSP. At step 615, the second node receives the out-of-band message, and in response, initiates the in-band echo request for the specified tunnel (e.g., to the third node) in step 620. (Notably, the second node may also return the optional RTSA message 400, described above.) The third node or other responding node receives the in-band echo request in step 625, and sends a response 500 to the first node (or the node specified in the echo request, as mentioned above), e.g., out-of-band, in step 630. As described herein, the responding node may be the third node, an egress node, an in-band (mid-point) node, or an out-of-band (not in-band) node (e.g., due to errors), and the response may be a positive (confirming reachability) or negative (refuting reachability). The procedure 600 for a directed echo request ends in step 635.

Directed Echo Requests and Reverse Traceroute

Also, according to embodiments of the disclosure, an interested node may utilize the directed echo requests as described above and may perform a "reverse traceroute." In particular, an interested node (e.g., node A) may send an out-of-band echo request (e.g., either an RTS message 300 or an echo request 500) to an in-band egress node (e.g., node E and/or F). If the egress node(s) responds, thus indicating that the egress is responsive (and reachable out-of-band), the interested node may send an out-of-band RTS message 300 to successive previous-hop in-band nodes (e.g., node D, node C, node B). The previous-hop in-band nodes in turn then send an echo request toward the egress node, and a response may be sent to the interested node accordingly (e.g., from one or more responding nodes, such as the egress node or other nodes). The interested node may continue to send out-of-band messages to successively previous-hop nodes until no longer necessary, e.g., until a failure location is determined or until the ingress node of the tunnel (the in-band ingress node) is reached without error. In this manner, the reverse traceroute technique thus works backwards to discover an in-band failure.

For example, one or more egress/leaf nodes may report failure of the in-band tunnel/tree, of which the interested node (e.g., source) may already know the set of nodes within the tunnel/tree (e.g., through configuration, conventional traceroute, etc., as will be understood by those skilled in the art). Because a conventional traceroute to determine the point of failure may return hundreds or thousands of response messages as described above, a reverse traceroute technique may be applied to constrain the number of responses received at the interested node.

Figure 7:
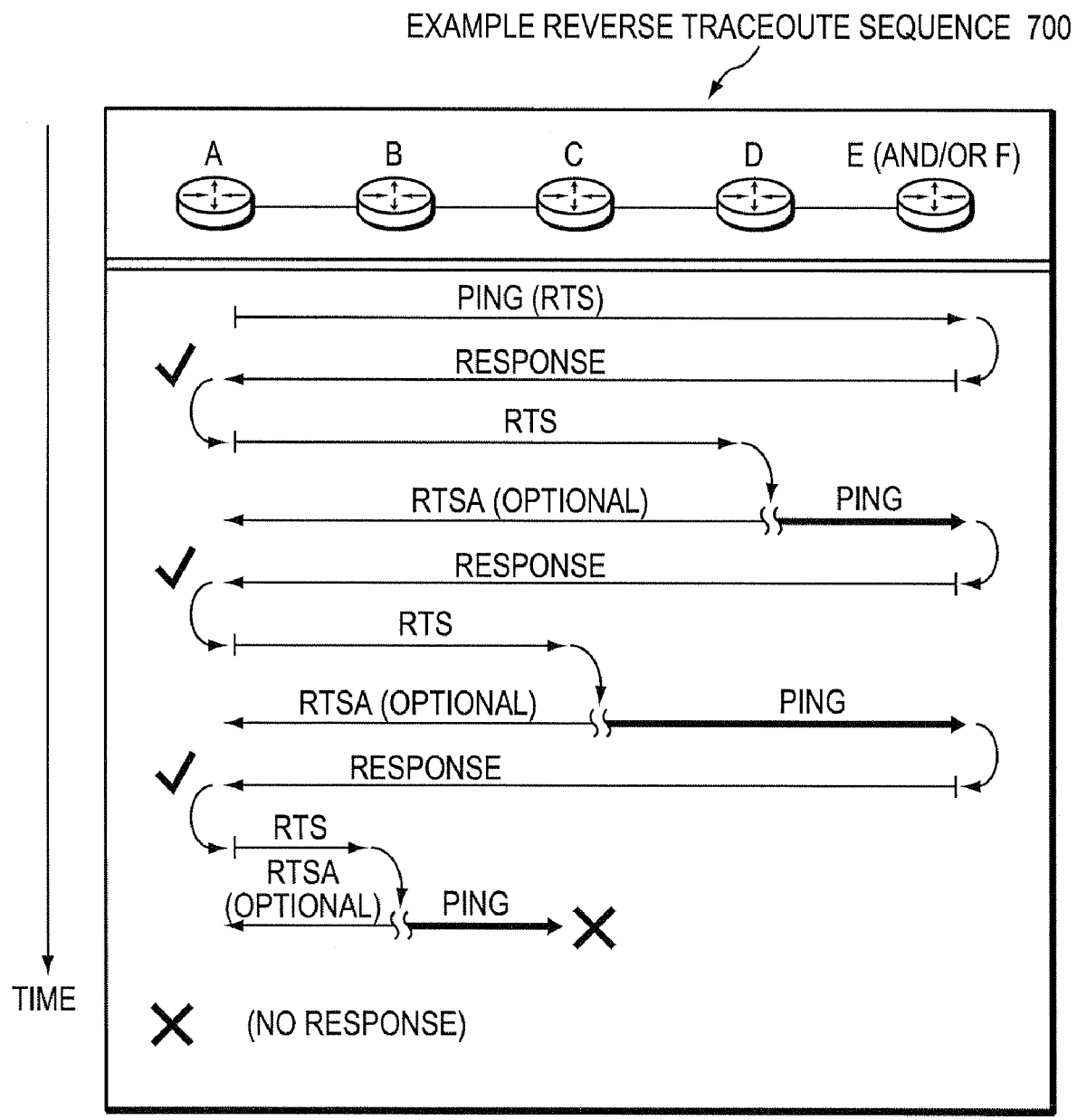
FIG. 7 illustrates an example reverse traceroute message exchange sequence.

For instance, FIG. 7 illustrates an example reverse traceroute message exchange sequence 700 in accordance with one or more embodiments described herein, e.g., described with reference to the nodes (and tunnel/tree portions) as in the network 100 shown in FIG. 1 above. The interested node (e.g., node A) may send an out-of-band message (e.g., an RTS message 300 or an echo request/ping message 500) to the egress node (e.g., node E) to determine whether the egress node is responsive/operational. Notably, there may be occasions where the interested node is unaware of the nodes within the in-band tunnel (in-band nodes), particularly previous-hop (upstream) nodes. Because of this, the RTS message 300 to the egress (and subsequent in-band nodes) may include a request for an upstream hop node, such as the previous-hop node, e.g., in request field 322, or, illustratively, within the RTSA requested field 324. The egress node (and/or subsequent in-band nodes, below) may respond to the RTS message 300 with an RTSA message 400 having populated the upstream hop field 429 accordingly (note that local and/or remote labels may also be included, as will be understood by those skilled in the art).

Once it is determined that the egress node has responded (e.g., with an echo response 500 and/or RTSA message 400), the interested node may subsequently send an out-of-band RTS message 300 to the previous-hop node of the egress, e.g., node D. (Notably, this particular phase is similar to the illustrative directed echo request shown in FIG. 1.) The previous-hop node receives the RTS message, and sends an in-band echo request ("ping") to the egress, and optionally an RTSA message 400 to the interested node, as described above. (Also, the RTSA again may include an indication of the next previous-hop in-band node, as mentioned above.) If the egress node responds, the interested node continues to send RTS messages to each node closer to the source/ingress (illustratively, the same as the interested node, node A) along the path of the tunnel/tree. Notably, as described above, the responding node need not be the egress node, such as, for example, where an error is encountered, or where other constraints request that nodes other than the egress node respond (e.g., as described below). Also, because responses may be generated by each egress (leaf) node (or each responding node) that receives the echo request in a P2 MP tree structure as described above, more and more responses will begin arriving at the interested node based on conventional multicasting techniques. Accordingly, the interested node may specifically request that the echo request be forwarded on one or more branches (i.e., toward one or more egress nodes). If the interested node does not receive an expected response from the egress/responding node, the interested node may determine the location of the failure (e.g., the "X" of the in-band ping from node B). Therefore, by iterating the results from RTS messages 300 that have been successively addressed to nodes one hop closer to the source, the point of in-band failure of the tunnel/tree can be determined. Notably, to increase reliability of the failure determination, the interested node may repeat sending the RTS to the current previous-hop node a configurable number of times (e.g., 2-3 repeat RTS messages) to lower the probability that the last echo message sent had failed for other reasons (e.g., dropped packets, temporary network issues, etc.), i.e., "confirming" the failure.

The interested node is able to perform the reverse traceroute technique while minimizing the network overhead involved. For instance, while in the example described herein node B is the next-hop from node A (the interested node), those skilled in the art will understand that there may be hundreds or thousands of other nodes/hops/branches located between nodes A and B. Thus, the reverse traceroute technique described herein efficiently bypasses conventional traceroute processing through each of the hundreds/thousands of nodes/egresses, particularly where branch distribution is limited, as mentioned above. Illustratively, the reverse traceroute process/service 246 of the interested node 200 may contain computer executable instructions for implementing reverse traceroute functions in accordance with one or more embodiments described herein, such as, e.g., the sequential/successive generation and analysis of echo messages accordingly.

Notably, while "successive" has been used herein to describe single-hop progression, one or more embodiments described herein may also utilize multiple-hop progression (e.g., skipping node C). While this may result in a less precise failure determination, there may be reasons in which it would be particularly useful and/or resource-saving. Moreover, in such a circumstance, if a failure was detected after transmission to a next-previous-hop node (i.e., skipping a previous-hop node), the directed echo request and reverse traceroute may continue downstream (next-hop node, e.g., node C) to determine whether the failure was between nodes B and C, or between nodes C and D. Further, directed echo requests may be used in a forward direction from a particular in-band intermediate node, e.g., waiting until a response is finally received to determine the point of failure. Those skilled in the art will also understand that while an illustrative embodiment sends directed echo requests to the egress node and each successively previous-hop node upstream, one or more embodiments may begin the procedure at any in-band node accordingly.

Further, in accordance with one or more embodiments of the disclosure, the interested (first) node may include within the RTS message 300 (e.g., in constraints field 326) a desired TTL value to be used for the echo request 500. For instance, while sequence 700 above shows the directed ping traversing all downstream hops to the egress, using TTL values 520 may shorten the transmission length (number of hops) of the echo message 500. Illustratively, utilizing a TTL of "2" would result in the echo request 500 traversing two downstream hops (e.g., including the node generating/injecting the echo request). By doing so, the interested node may determine in-band connectivity on a segmented basis, i.e., checking shorter segments for in-band reachability, and aggregating the reachability of the segments to determine reachability of the tunnel to the egress. For example, an RTS to node B may only need to verify in-band reachability to a responding node C (or node D, TTL "3") once it has been determined that node C can reach node D, which can reach node E, etc. Accordingly, where the present disclosure references sending the echo requests "to" or "toward" the egress node (or third node, above), a TTL value/timer may result in an earlier in-band node responding to the echo request accordingly, as will be understood by those skilled in the art. Also, in the event the egress node is unknown, the interested node may request that a specified tunnel receive an echo message having a certain TTL value. In this manner, a "directed traceroute" may be accomplished, e.g., where increasing TTL values are sent to the same mid-point node along the desired tunnel in order to determine the route to the egress(es) of the tunnel.

Figure 8:
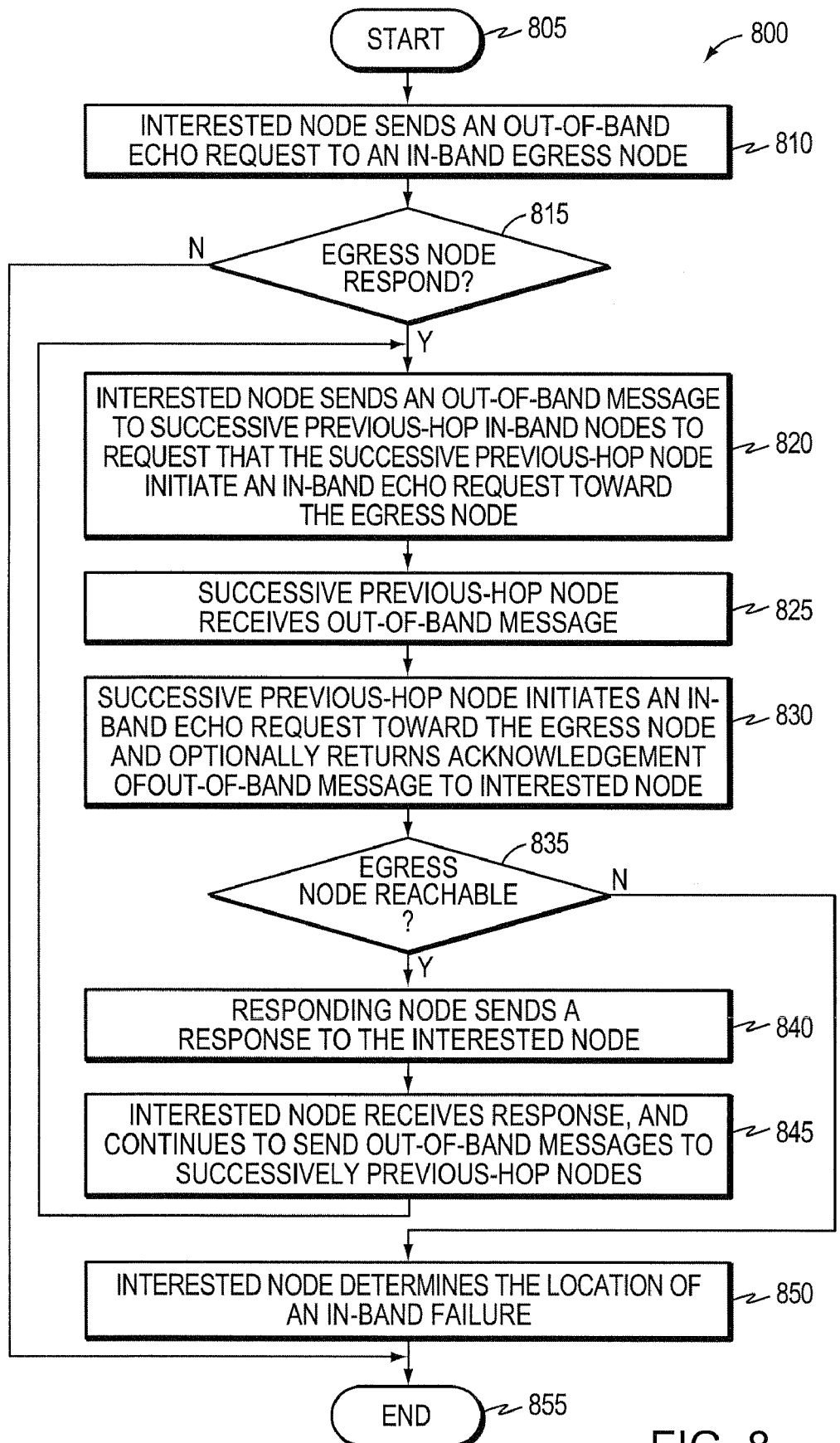
FIG. 8 illustrates an example procedure for a directed echo request and reverse traceroute.

FIG. 8 illustrates an example procedure for a directed echo request and reverse traceroute in accordance with one or more embodiments described herein. The procedure 800 starts at step 805, and continues to step 810, where an interested node (e.g., node A) sends an out-of-band echo request (300 or 500) to an in-band egress node (e.g., node E and/or F). In step 815, if the egress node does not respond, the procedure ends at step 855, e.g., thus determining that the egress node is not responding. If at step 815 the egress node does respond, the interested node sends an out-of-band message (e.g., an RTS message 300) to successive previous-hop in-band nodes (e.g., a first previous-hop node D) in step 820 to request that the successive previous-hop node initiate an in-band echo request 500 toward the egress node (e.g., with a TTL described above). At step 825, the successive previous-hop node (e.g., D) receives the out-of-band message, and in step 830 initiates an in-band echo request 500 toward the egress node in response (and optionally sends an acknowledgement, RTSA, to the interested node, as described above).

If the egress node (or, notably, another responding node) receives the in-band echo request 500 (i.e., the egress is reachable) in step 835, the egress/responding node sends a response 500 (e.g., out-of-band) to the interested node in step 840 (or, as mentioned above, to a node indicated by the in-band echo request). The interested node may then receive the response (i.e., indicating reachability) in step 845, and continues to send out-of band messages (RTS messages 300) to successively previous-hop nodes (e.g., to a second previous-hop node C, then a third previous-hop node B, etc.). Notably, as mentioned above, the interested node may include within the out-of-band message a specific request to limit in-band transmission to one or more branches (i.e., to one or more egress nodes) if necessary based on in-band multicasting.

The interested node continues to send out-of-band messages to successive previous-hop in-band nodes in step 820 until the egress node or other node that should normally have responded does not (or could not) receive the resultant in-band echo request 500 in step 835 (thus, consequently, until the interested node does not receive a response to the in-band request), or until a negative (refuted reachability) response is received. Upon determining that the egress node is not reachable, the interested node determines a location of an in-band failure in step 850. As described above, then, the interested node may determine that an in-band break has occurred between the current previous-hop node (e.g., node B) and the last previous-hop node (e.g., node C). Notably, if the interested node knows that the current previous-hop node (node B) is responding (e.g., via an RTSA message 400), the interested node further knows that the current previous-hop node has initiated an unsuccessful in-band echo request. Accordingly, the tunnel between node B and node C has failed (and not node B itself). Moreover, repeated echo requests may be made to ensure that the failure was not due to other reasons (e.g., dropped packets), as described above. The procedure 800 then ends in step 855.

Advantageously, the novel techniques described herein define a directed echo request and reverse traceroute to be used in a computer network. By allowing one node to request that another initiate an echo request, the novel technique allows interested nodes to monitor/manage in-band paths (e.g., tunnels) on which the interested node need not be located. Also, the novel techniques described herein allow for efficient management of in-band paths (e.g., tunnels), particularly for in-band trees, such as P2 MP trees. Specifically, the novel technique may lower management overhead, and avoid possible false error detections, e.g., by focusing the echo request messages to particular in-band segments, especially where in-band multicasting may be performed. Further, by utilizing a reverse traceroute, the novel technique may provide a faster problem location/resolution than currently available techniques.

While there has been shown and described illustrative embodiments that define a directed echo request and reverse traceroute to be used in a computer network, it is to be understood that various other adaptations and modifications may be made within the spirit and scope of the present invention. For example, the embodiments have been shown and described herein with/using MPLS LSPs as the in-band paths. However, the embodiments of the invention in its broader sense are not so limited, and may, in fact, be used with any type of "in-band" path (multicast trees or not), such as various tunneling/encapsulation protocols, e.g., IPSec, PPP, L2TP, etc., as will be understood by those skilled in the art. Also, while the above description describes utilizing IP routing as the out-of-band routes, those skilled in the art will understand that any method of reaching the destination that is not "in-band" is an "out-of-band" path, e.g., ATM, other tunneling/encapsulation protocols, etc. Further, while the above description illustratively utilizes an MPLS ping as the echo request, any type of echo request may be used accordingly, such as, e.g., ICMP pings, multi-link bi-directional forwarding detection (BFD) messages, proprietary echo request protocols, other connectivity verification messages, etc., as will be understood by those skilled in the art. Moreover, references to various fields within various messages (RTS 300, RTSA 400, echo request 500) are merely illustrative, and values indicative of certain features and/or functions described herein may be placed elsewhere within the respective message.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   sending an out-of-band message from a first node to a second node on a specified tunnel that is located intermediate between an ingress node and an egress node of the specified tunnel, the out-of-band message configured to request that the second node initiate an in-band echo request for the specified tunnel toward one or more third nodes on the specified tunnel, wherein one or more responding nodes are configured to send a corresponding out-of-band response to the first node;
   verifying that the second node can reach a particular third node in-band based on a corresponding response received at the first node; and
   wherein the first node is not along the tunnel.

2. The method as in claim 1, further comprising:
   failing to verify that the second node can reach the third node in-band when no response is received at the first node.

3. The method as in claim 2, further comprising:
   sending one or more additional out-of-band messages from the first node to the second node to request that the second node initiate an in-band echo request toward the third node; and
   confirming that the second node cannot reach the third node in-band when no response is received at the first node.

4. The method as in claim 1, wherein the third node is not an egress of the tunnel.

5. The method as in claim 1, wherein the third node is the responding node.

6. The method as in claim 1, wherein the step of sending comprises the step of sending the in-band echo request over a Point-to-Multipoint (P2MP) tunnel having one or more branches, and wherein the out-of-band message is further configured to specify which of the one or more branches the in-band echo request is to be sent.

7. The method as in claim 1, wherein the in-band echo request is a Multi-Protocol Label Switching (MPLS) echo message.

8. The method as in claim 1, further comprising:
   receiving, at the first node, an acknowledgement of receipt of the out-of-band message from the second node.

9. The method as in claim 1, further comprising:
   specifying a time-to-live (TTL) value within the out-of-band message to be used within the in-band echo request.

10. A method, comprising:
    sending an out-of-band message from a first node to a second node, the out-of-band message configured to request that the second node initiate an in-band echo request for a specified tunnel toward one or more third nodes, wherein one or more responding nodes are configured to send a corresponding out-of-band response to the first node;
    receiving the corresponding out-of-band response at the first node;
    sending out-of-band messages from the first node to successive previous-hop in-band nodes of the second node to request that the successive previous-hop node initiate an in-band echo request toward the third node; and
    continuing to send the out-of-band messages until an in-band failure location is determined or an ingress node is reached.

11. The method as in claim 10, further comprising:
    requesting that the second node inform the first node of at least one of either its one or more previous-hop in-band nodes or its one or more next-hop in-band nodes.

12. The method as in claim 10, wherein the first node is not along the specified tunnel.

13. The method as in claim 10, wherein the third node is not an egress of the specified tunnel.

14. The method as in claim 10, wherein the third node is the responding node.

15. The method as in claim 10, wherein the specified tunnel is a Point-to-Multipoint (P2MP) tunnel having one or more branches, and wherein one or more of the out-of-band messages are further configured to specify which of the one or more branches an in-band echo request is to be sent.

16. The method as in claim 10, wherein one or more of the in-band echo requests are a Multi-Protocol Label Switching (MPLS) echo messages.

17. The method as in claim 10, further comprising:
    specifying a time-to-live (TTL) value within one or more of the out-of-band messages to be used within a corresponding in-band echo request.

18. A first node, comprising:
    one or more network interfaces;
    one or more processors coupled to the one or more network interfaces and configured to execute one or more software processes; and
    a memory configured to store a directed echo request process executable by the one or more processors, the directed echo request process configured to: i) send an out-of-band message to a second node on a specified tunnel that is located intermediate between an ingress node and an egress node of a-the specified tunnel, the out-of-band message configured to request that the second node initiate an in-band echo request for the specified tunnel toward one or more third nodes on the specified tunnel, wherein one or more responding nodes are configured to send a corresponding out-of-band response to the first node, and ii) determine whether the second node can reach the third node in-band based on a corresponding response received at the first node; and wherein the first node is not along the tunnel.

19. The first node as in claim 18, wherein the directed echo request process is further configured to:
receive a response from the third node that indicates that the third node is not reachable; and
in response, determine that the second node cannot reach the third node in-band.

20. The first node as in claim 18, wherein the third node is the responding node.

21. The first node as in claim 18, wherein the first node is an in-band ingress node.

22. A first node, comprising:
one or more network interfaces;
one or more processors coupled to the one or more network interfaces and adapted to execute one or more software processes; and
a memory configured to store a directed echo request process executable by the one or more processors, the directed echo request process configured to: i) send an out-of-band message to a second node, the out-of-band message configured to request that the second node initiate an in-band echo request for a specified tunnel toward one or more third nodes, wherein one or more responding nodes are configured to send a corresponding out-of-band response to the first node, and ii) receive the corresponding out-of-band response at the first node,
wherein the memory is further configured to store a reverse traceroute process executable by the processor, the reverse traceroute process configured to: i) send out-of-band messages to successive previous-hop in-band nodes of the second node to request that the successive previous-hop node initiate an in-band echo request to the third node, and ii) continue to send the out-of-band messages until the third node does not send a corresponding response to the first node.

23. The first node as in claim 22, wherein the reverse traceroute process is further configured to:
determine an in-band failure location based on the previous-hop node that most recently received an out-of band message from the first node.

24. A method, comprising:
receiving an out-of-band message from a first node at a second node on a specified tunnel that is located intermediate between an ingress node and an egress node of the specified tunnel;
in response to the out-of-band message, initiating an in-band echo request at the second node for the specified tunnel toward a third node on the specified tunnel, wherein one or more responding nodes are configured to send a corresponding out-of-band response to the first and
wherein the first node is not along the tunnel.

25. The method as in claim 24, further comprising:
returning an acknowledgement of receipt of the out-of band message from the second node to the first node.

26. An apparatus, comprising:
means for sending an out-of-band message from a first node to a second node that is located intermediate between an ingress node and an egress node of a specified tunnel, the out-of-band message configured to request that the second node initiate an in-band echo request for a specified tunnel toward one or more third nodes to cause one or more responding nodes to send a corresponding out-of-band response to the first node;
means for sending additional out-of-band messages from the first node to successive previous-hop in-band nodes of the second node to request that each successive previous-hop node initiate an in-band echo request toward the third node until a corresponding response is not received at the first node; and
means for determining an in-band failure location based on a lack of corresponding response.

* * * * *

UNITED STATES PATENT AND TRADEMARK OFFICE
CERTIFICATE OF CORRECTION

PATENT NO. : 7,746,796 B2  Page 1 of 1
APPLICATION NO. : 11/537244
DATED : June 29, 2010
INVENTOR(S) : George Swallow et al.

It is certified that error appears in the above-identified patent and that said Letters Patent is hereby corrected as shown below:

Col. 15, Line 3 delete "a-the" substitute --the--

Signed and Sealed this
Tenth Day of May, 2011

David J. Kappos
*Director of the United States Patent and Trademark Office*